United States Patent
Holmes, III

(10) Patent No.: US 6,167,927 B1
(45) Date of Patent: Jan. 2, 2001

(54) ARRANGEMENT FOR MOUNTING A CUTTING HEAD ASSEMBLY OF A DELIMBING DEVICE ON A SUPPORT MEMBER

(75) Inventor: Robert H. Holmes, III, Bonifay, FL (US)

(73) Assignee: Caterpillar Inc., Peoria, IL (US)

( * ) Notice: Under 35 U.S.C. 154(b), the term of this patent shall be extended for 0 days.

(21) Appl. No.: 09/438,042

(22) Filed: Nov. 10, 1999

(51) Int. Cl.[7] .................................................. A01G 23/095
(52) U.S. Cl. .................................. 144/24.13; 144/208.8; 144/335; 144/343
(58) Field of Search ................................ 144/4.1, 24.13, 144/208.8, 335, 340, 343

(56) References Cited

U.S. PATENT DOCUMENTS

| 3,731,719 | 5/1973 | Pierrot, III et al. . |
| 3,805,859 | 4/1974 | Kessler et al. . |
| 4,111,245 | 9/1978 | McCrary et al. . |
| 4,749,012 | 6/1988 | Hamby, Jr. . |
| 4,850,405 | 7/1989 | Johnson et al. . |
| 4,899,794 | 2/1990 | Hamby, Jr. . |
| 5,322,103 | 6/1994 | Hudson . |
| 5,406,997 | 4/1995 | Davison . |
| 5,515,895 | 5/1996 | Hamby, Jr. ................... 144/24.13 |
| 5,704,407 | 1/1998 | Hamby, Jr. ................... 144/24.13 |

*Primary Examiner*—W. Donald Bray
(74) *Attorney, Agent, or Firm*—Maginot, Addison & Moore

(57) ABSTRACT

A delimbing device includes a cutting head assembly having (i) a cutting blade configured to cut branches off of a tree and (ii) a bar saw configured to cut through the tree. The device also includes a first support member supporting the cutting head assembly. The device further includes a second support member supporting the cutting head assembly. The device also includes a bearing assembly secured to the first support member and the second support member so that (i) the bearing assembly is interposed between the first support member and the second support member and (ii) the cutting head assembly can rotate relative to the second support member around an axis of rotation such that when a rotational force is applied to the cutting head assembly the cutting head assembly rotates from a first orientation to a second orientation. The bearing assembly is configured so that when the rotational force is removed from the cutting head assembly the cutting head assembly spontaneously returns to the first orientation from the second orientation.

20 Claims, 6 Drawing Sheets

ARRANGEMENT FOR MOUNTING A CUTTING HEAD ASSEMBLY OF A DELIMBING DEVICE ON A SUPPORT MEMBER

BACKGROUND OF THE INVENTION

The present invention relates generally to a delimbing device, and more particularly to an arrangement for mounting a cutting head assembly of a delimbing device on a support member.

Delimbing devices are utilized in whole tree forestry applications to remove branches from felled trees. Removing the limbs from felled trees results in the production of limbless logs which are much easier to load and transport than trees having limbs.

One type of delimbing device includes a boom loader and a cutting head assembly rotatably mounted on a frame. Having the cutting head assembly rotatably mounted on the frame facilitates the delimbing process. In particular, prior to cutting the limbs off of a tree, the cutting head assembly is preferably rotated relative to the frame so that the cutting head assembly is positioned in a loading orientation. Having the cutting assembly positioned in the loading orientation aids the boom loader operator in placing the tree in a channel defined in the cutting head assembly. Once the tree is placed in the channel, the boom loader pulls the tree therethrough such that a pair of blades attached to the cutting head assembly cut off the tree limbs. Once delimbed, the tree is cut to the appropriate length with a bar saw and then loaded onto a transport, such as a truck.

One problem with the above described arrangement is that pulling the tree through the channel communicates rotational forces to the cutting head assembly so that it is no longer positioned in the loading orientation after the tree has been delimbed. Therefore, once a tree has been delimbed, the cutting head assembly must be repositioned in the loading orientation before the next tree is delimbed.

Heretofore, various mechanism have been used to reposition the cutting head assembly in the loading orientation after delimbing a tree. For example, various mechanisms which include springs or hydraulic cylinders have been employed to reposition the cutting head assembly in the loading orientation after delimbing a tree. However, these mechanism tend to be mechanically complex and expensive to manufacture. In addition, the mechanical complexity of these types mechanism tend to increase the maintenance cost of operating the delimbing device.

SUMMARY OF THE INVENTION

In accordance with one embodiment of the present invention there is provided a delimbing device arrangement. The arrangement includes a cutting head assembly. The arrangement also includes a first support member supporting the cutting head assembly. The arrangement further includes a second support member supporting the cutting head assembly. The arrangement also includes a bearing assembly secured to the first support member and the second support member so that (i) the bearing assembly is interposed between the first support member and the second support member and (ii) the cutting head assembly can rotate relative to the second support member around an axis of rotation such that when a rotational force is applied to the cutting head assembly the cutting head assembly rotates from a first orientation to a second orientation. The bearing assembly is configured so that when the rotational force is removed from the cutting head assembly the cutting head assembly spontaneously returns to the first orientation from the second orientation.

In accordance with another embodiment of the present invention there is provided a delimbing device. The device includes a cutting head assembly having (i) a cutting blade configured to cut branches off of a tree and (ii) a bar saw configured to cut through the tree. The device also includes a first support member supporting the cutting head assembly. The device further includes a second support member supporting the cutting head assembly. The device also includes a bearing assembly secured to the first support member and the second support member so that (i) the bearing assembly is interposed between the first support member and the second support member and (ii) the cutting head assembly can rotate relative to the second support member around an axis of rotation such that when a rotational force is applied to the cutting head assembly the cutting head assembly rotates from a first orientation to a second orientation. The bearing assembly is configured so that when the rotational force is removed from the cutting head assembly the cutting head assembly spontaneously returns to the first orientation from the second orientation.

In accordance with yet another embodiment of the present invention there is provided a delimbing device. The device includes a cutting head assembly having a pair of blades configured to cut branches off of a tree. The device also includes a grapple configured to grasp the tree. The device further includes a frame for supporting the cutting head assembly and the grapple. The device also includes a bearing assembly interposed between the cutting head assembly and the frame so that the cutting head assembly can rotate relative to the frame around an axis of rotation such that when a rotational force is applied to the cutting head assembly the cutting head assembly rotates from a first orientation to a second orientation. The bearing assembly is configured so that when the rotational force is removed from the cutting head assembly the cutting head assembly spontaneously returns to the first orientation from the second orientation.

DETAILED DESCRIPTION OF THE PREFERRED EMBODIMENT

Figure 1:
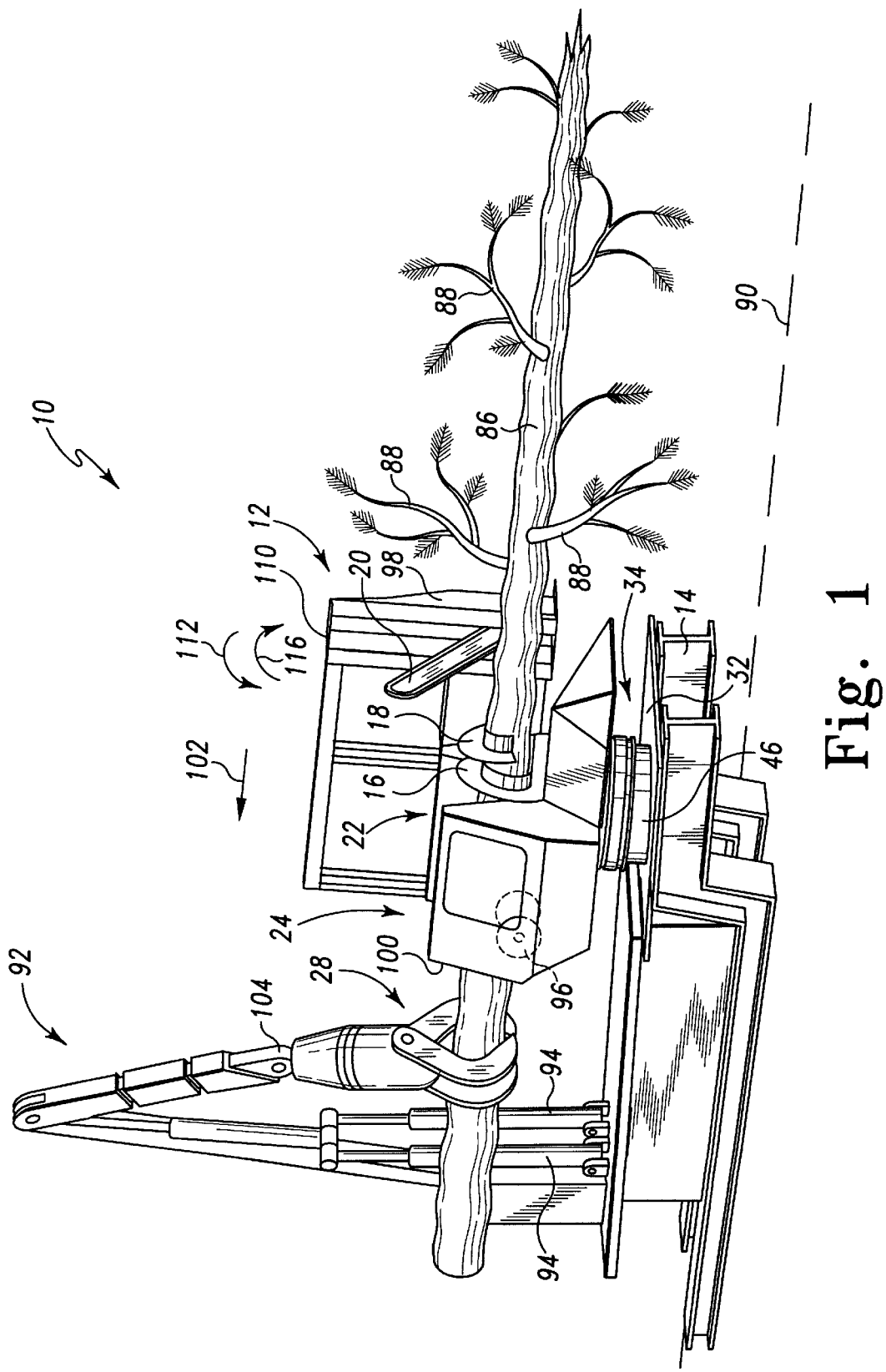
FIG. 1 is a perspective view of a delimbing device which incorporates the features of the present invention therein, note that the delimbing device is in the process of delimbing a tree.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Referring now to FIG. 1, there is shown a delimbing device 10 (hereinafter referred to as device 10) which incorporates the features of the present invention therein. Device 10 includes a frame 14, a cutting head assembly 12, a bearing assembly 34, a boom 92, and a grapple 28. It should be understood that frame 14 can be equipped with a number of wheels (not shown) so that device 10 can be easily transported between work sites.

Boom 92 is supported by, and secured to, frame 14. In addition, a pair of hydraulic cylinders 94 are attached to boom 92 and frame 14. Hydraulic cylinders 94 are operatively coupled to a pressure source (not shown) in a well known manner so that boom 92 can be manipulated by an operator (not shown) of device 10. Grapple 28 is attached to an end 104 of boom 92. Grapple 28 includes a number of hydraulic cylinders (not shown) operatively coupled to a pressure source in a well known manner so that grapple 28 can also be manipulated by the operator of device 10. For example, grapple 28 can be manipulated by the operator of device 10 so that a tree 86 is grasped by grapple 28.

As shown more clearly in FIGS. 2A, 2B, 3, 4, and 5, cutting head assembly 12 includes a housing 24, an enclosure 110, a roller 96, a bar saw 20, and a pair of cutting blades 16 and 18. Enclosure 110 is attached to housing 24 and contains bar saw 20 (see FIG. 2A). Bar saw 20 is pivotally mounted within enclosure 110 so that bar saw 20 can pivot relative to enclosure 110 in the directions indicated by arrows 112 and 116 (see FIG. 1).

Figure 3:
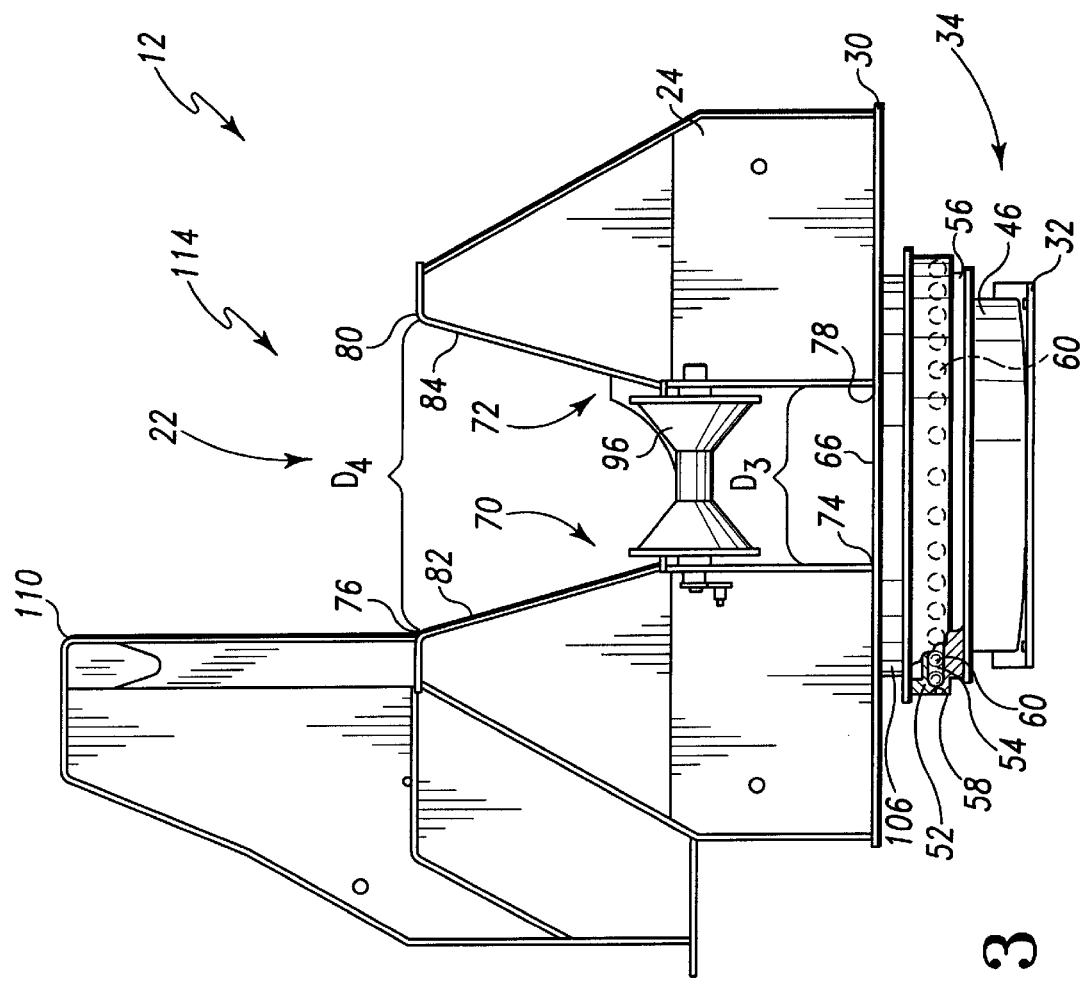
FIG. 3 is an end view of the cutting head assembly and bearing assembly of FIG. 2 showing the log channel defined in the cutting head assembly.

As more clearly shown in FIG. 3, housing 24 includes a wall 70 and a wall 72. Wall 70 and wall 72 define a log channel 22. In particular, wall 70 has an end 74 and an end 76. End 74 of wall 70 is secured to a support member 30 so that wall 70 extends upwardly from support member 30. In a similar fashion, wall 72 has an end 78 and an end 80. End 78 of wall 72 is secured to support member 30 so that wall 72 extends upwardly from support member 30 in an opposing relationship to wall 70 so as to define log channel 22. Securing end 74 of wall 70 and end 78 of wall 72 to support member 30 in the above described manner results in end 74 and end 78 being separated by a distance $D_3$. Furthermore, wall 70 includes a wall segment 82 which is angled away from wall 72. Wall 72 includes a wall segment 84 which is angled away from wall 70. Having wall segments 82 and 84 angled in the above described manner results in end 76 of wall 70 and end 80 of wall 72 being separated by a distance $D_4$ which is greater than distance $D_3$. Having ends 76 and 80 separated by distance $D_4$ which is greater than the distance $D_3$ separating end 74 and end 78 results in log channel 22 having a relatively wide upper opening 114. The relatively wide upper opening 114 of log channel 22 facilitates the placement of trees 86 into log channel 22.

Figure 2A:
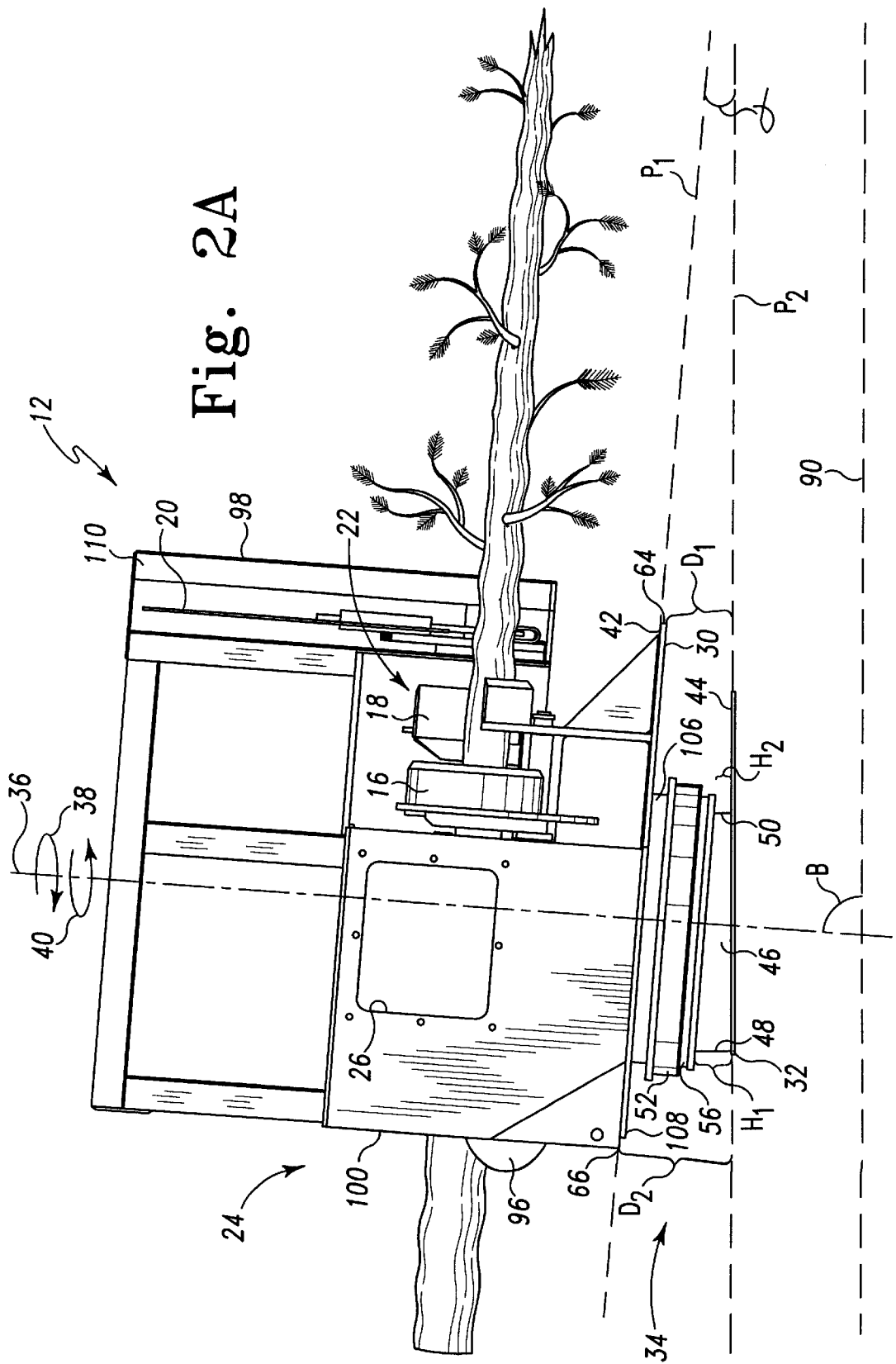
FIG. 2A is a side elevational view of the cutting head assembly and bearing assembly of the delimbing device of FIG. 1, note that the cutting head assembly is shown in the first orientation.

As shown more clearly in FIG. 2A, log channel 22 has a blade end 64 and an exit end 66. Cutting blades 16 and 18 are attached to housing 24 so that cutting blades 16 and 18 are near blade end 64 of log channel 22. It should be appreciated that cutting blades 16 and 18 are operatively coupled to an actuation mechanism (not shown) in a well known manner so that cutting blades 16 and 18 are able to pivot toward each other and delimb a tree 86 advanced through log channel 22 (see FIG. 1). Roller 96 is rotatably attached to housing 24 such that roller 96 is adjacent exit end 66 of log channel 22.

Figure 6:
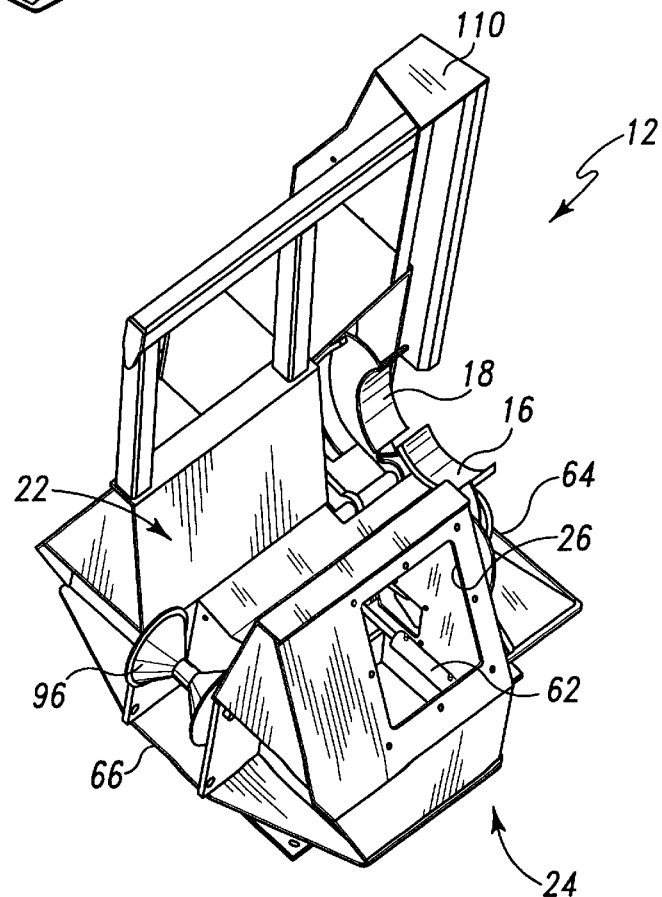
FIG. 6 is a view similar to FIG. 5 showing an additional chamber defined in the housing of the cutting head assembly.

In addition, housing has a number of chambers 26 defined therein. Each chamber 26 can have a number of cutting head assembly 12 components disposed therein. In particular, as shown in FIG. 6, chamber 26 can have a hydraulic component 62 of cutting head assembly 12 disposed therein. Having components of cutting head assembly 12 located within chambers 26 protects the cutting head assembly 12 components from being damaged during use of device 10. For example, having the components of cutting head assembly 12 located within chambers 26 prevents the components from being damaged by tree limbs 88 (see FIG. 1) during the delimbing process.

Figure 4:
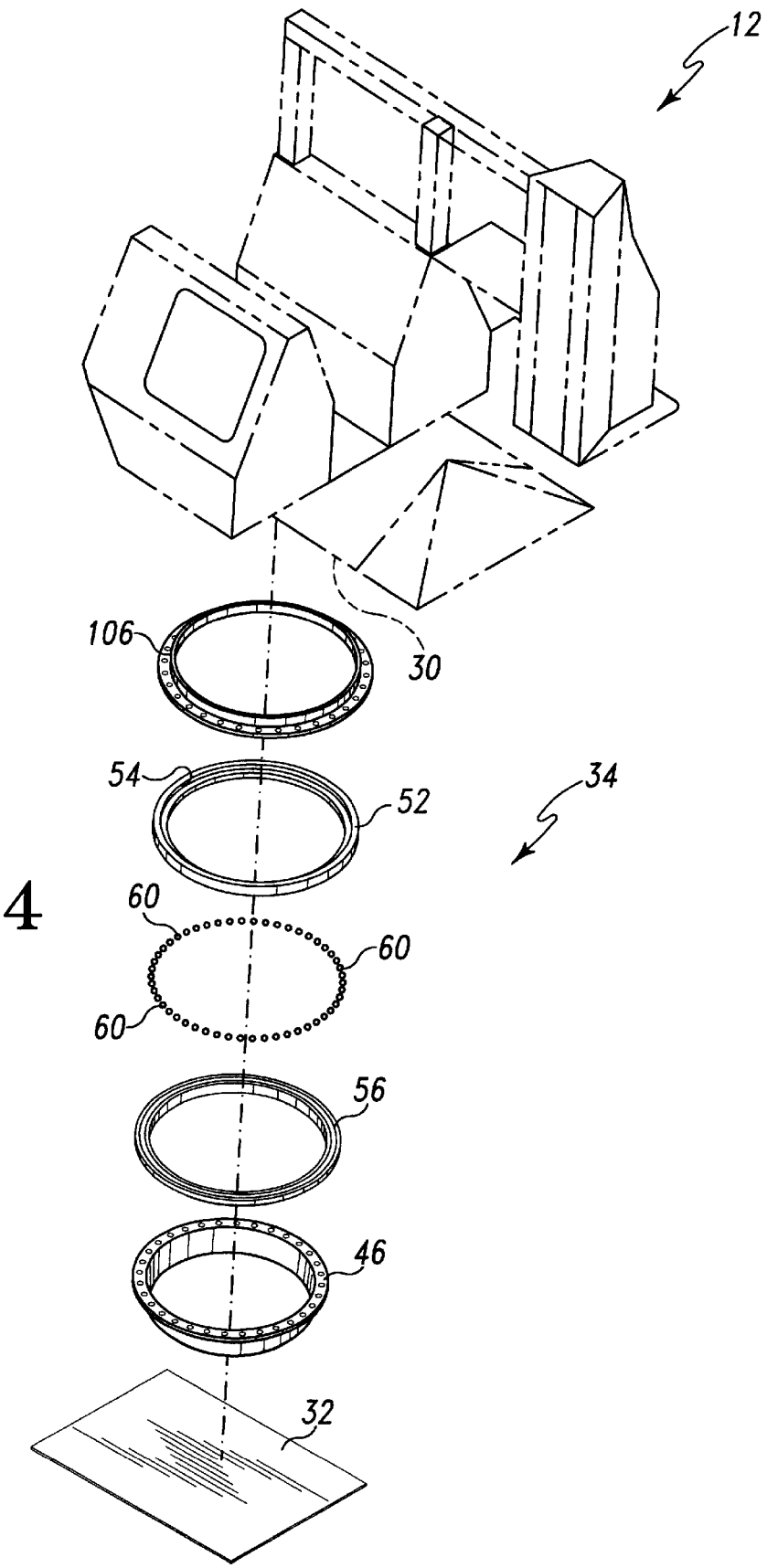
FIG. 4 is an exploded view of the bearing assembly shown in FIG. 2.
Figure 5:
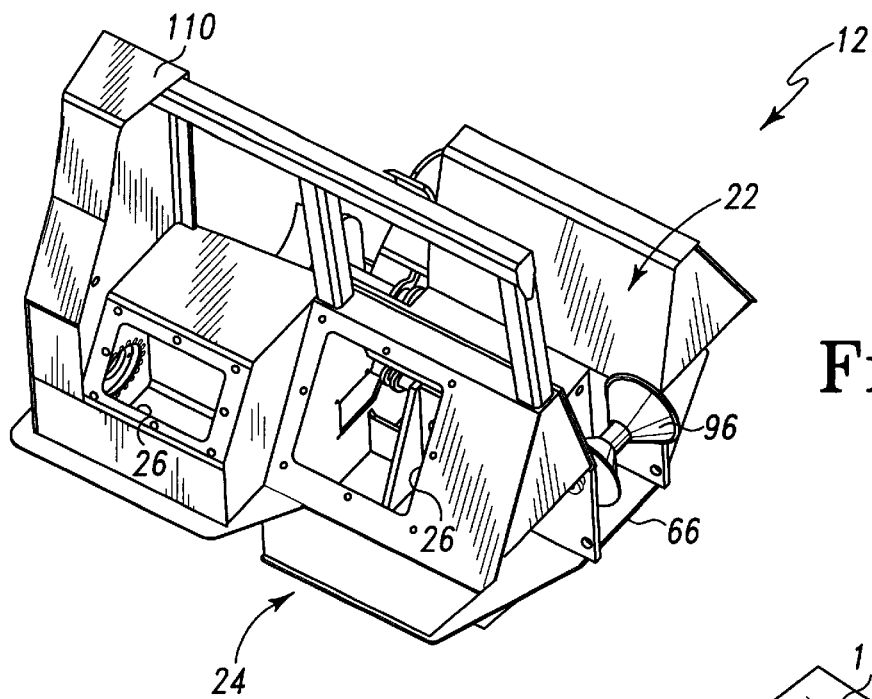
FIG. 5 is a perspective view of the cutting head assembly of FIG. 2 showing chambers defined in a housing of the cutting head assembly.

As shown in FIG. 4, bearing assembly 34 includes a riser ring 46, an inner hoop 56, and a number of ball bearings 60. Bearing assembly 34 also includes an outer hoop 52 which defines an interior void 54. Bearing assembly 34 further includes a connecting member 106.

Referring now to FIGS. 1 and 2A, bearing assembly 34 is interposed between frame 14 and cutting head assembly 12 so that bearing assembly 34 supports cutting assembly 12 above frame 14. Specifically, as more clearly shown in FIG. 2A, cutting head assembly 12 is mounted on support member 30 so that support member 30 supports cutting head assembly 12. Connecting member 106 is secured to an under surface 108 of support member 30. Outer hoop 52 is then secured to connecting member 106 such that outer hoop 52 is unable to move or rotate in relation to support member 30 and connecting member 106.

As shown in FIG. 1, support member 32 is placed onto frame 14. Riser ring 46 is secured to support member 32 so that riser ring 46 extends upwardly from support member 32. It should be appreciated that riser ring 46 has a wall segment 48 and a wall segment 50 (see FIG. 2A). It should also be appreciated that (i) wall segment 48 has a height $H_1$, (ii) wall segment 50 has a height $H_2$, and (iii) $H_1$ is greater than $H_2$. It should further be appreciated that riser ring 46 is secured to support member 32 so that wall segment 48 of riser ring 46 is facing boom 92. Inner hoop 56 is then secured to riser ring 46. Frame 14, support member 32, riser ring 46, and inner hoop 56 are all secured to one another so that none of these components are able to move or rotate relative to each other.

Now referring to FIG. 3, cutting head assembly 12, with support member 30, connecting member 106, and outer hoop 52 attached thereto, is positioned relative to inner hoop 56 such that a portion 58 of inner hoop 56 extends into interior void 54 of outer hoop 52. It should be understood that a groove (not shown) defined in an interior surface of outer hoop 52 is placed in an opposing relationship with a groove defined in portion 58 of inner hoop 56 so that the aforementioned grooves cooperate to define a race for ball bearings 60. Ball bearings 60 are then located within the aforementioned race within interior void 54 so that ball bearings 60 are interposed between portion 58 of inner hoop 56 and outer hoop 52.

Positioning bearing assembly 34 and cutting head assembly 12 in the above described manner mounts cutting head assembly 12 on frame 14 as shown in FIG. 1. In particular, as shown more clearly in FIG. 2A, bearing assembly 34 allows cutting head assembly 12 to rotate relative to frame 14 and support member 32 around an axis of rotation 36 in the directions indicated by arrows 38 and 40. Furthermore, it should be appreciated that having riser ring 46 positioned on frame 14 such that wall segment 48 is facing boom 92 and wall segment 50 is facing away from boom 92 results in cutting head assembly 12 being angled or tilted away from boom 92 since the height $H_1$ of wall segment 48 is greater than the height $H_2$ of wall segment 50. As shown in more detail in FIG. 2A, cutting head assembly 12 is mounted on frame 14 in a tilted or angled fashion such that a plane $P_1$ defined by a surface 42 of support member 30 intersects a plane $P_2$ defined by a surface 44 of support member 32 so that an angle α is defined by the intersection of planes $P_1$ and $P_2$. Preferably, the angle α defined by the intersection of planes $P_1$ and $P_2$ is about $1° \leq α \leq 10°$. More preferably, α=4.5°.

In addition, having cutting head assembly 12 mounted in the above described tilted fashion results in the axis of rotation 36 of cutting head assembly 12 intersecting the longitudinal axis 90 of frame 14 so as to define an angle β which is less than 90°. Moreover, having cutting head assembly 12 mounted in the above described tilted fashion results in (i) blade end 64 of log channel 22 being spaced vertically above plane $P_2$ by a distance $D_1$ and (ii) exit end 66 of log channel 22 being spaced vertically above plane $P_2$ by a distance $D_2$, where distance $D_1$ is less than distance $D_2$.

Figure 2B:
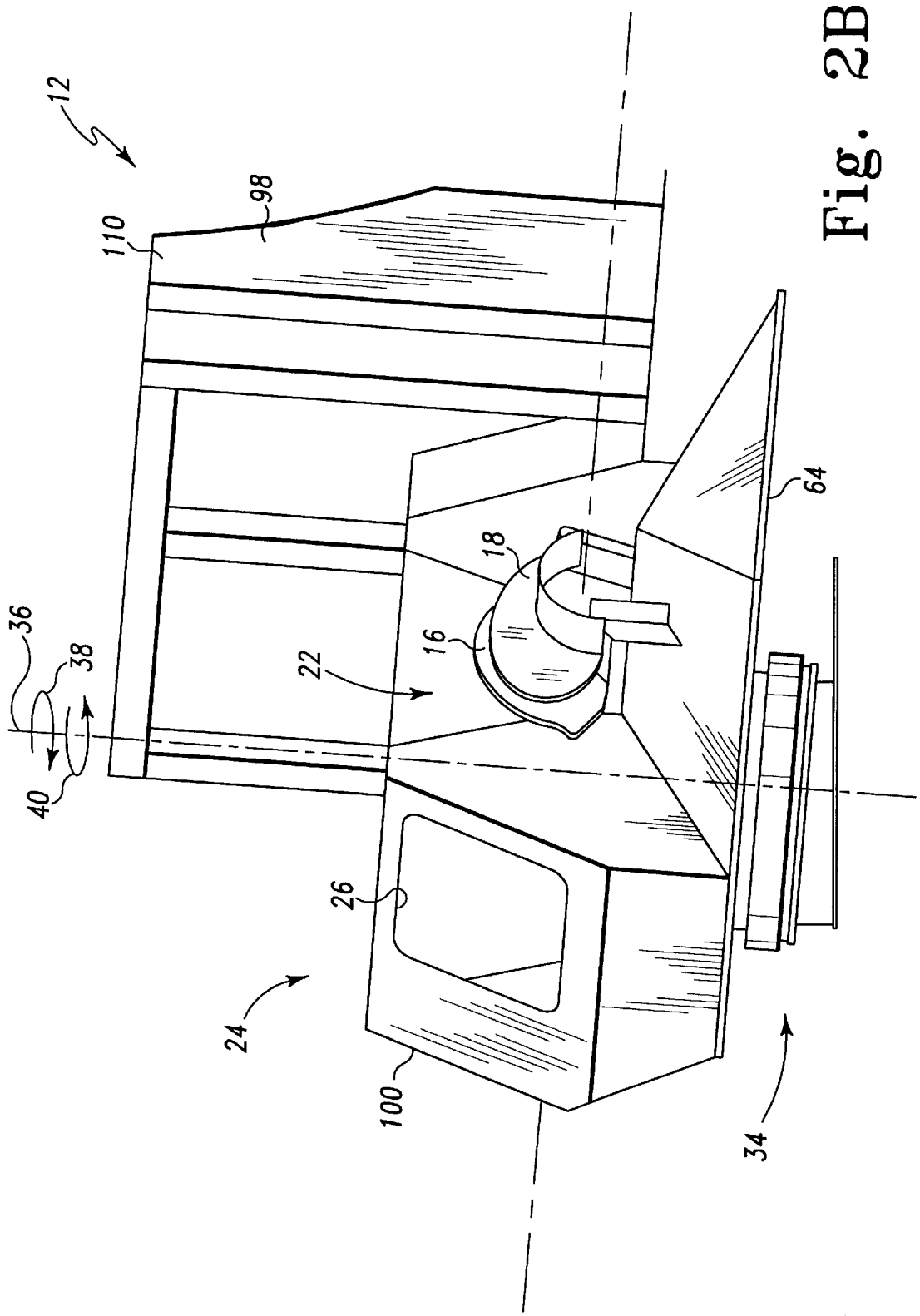
FIG. 2B is a view similar to FIG. 2A, but showing the cutting head assembly after being rotated from the first orientation to a second orientation, note that the tree has been removed for clarity of description.

Having riser ring 46 configured in the above described manner so that cutting head assembly 12 is mounted in a angled or tilted fashion is an important aspect of the present invention since it causes cutting head assembly 12 to spontaneously return to a first orientation or loading position (see FIG. 2A) after being rotated around axis 36. For example, when a rotational force is applied to cutting head assembly 12, cutting head assembly 12 will rotate around rotational axis 36 in the direction indicated arrow 38. Rotating around rotational axis 36 in the direction indicated arrow 38 causes cutting head assembly 12 to move from the first orientation, as shown in FIG. 2A, to a second orientation as shown in FIG. 2B. However, once cutting head assembly 12 is rotated from the first orientation (see FIG. 2A) to the second orientation (see FIG. 2B) and the rotational force is removed from cutting head assembly 12, cutting head assembly 12 will spontaneously rotate in the direction indicated by arrow 40 (see FIG. 2B) and return to the first orientation. It should be appreciated that when cutting head assembly 12 is located in the first orientation a rear portion 100 (see FIG. 2A) of cutting head assembly 12 is positioned to face boom 92 (see FIG. 1) while a front portion 98 of cutting head assembly 12 is positioned to face away from boom 92.

What is meant herein by the term "spontaneously" is that cutting head assembly 12 will automatically return to the first orientation when the rotational force is removed therefrom without the use of any additional mechanisms (e.g. springs, motors, or hydraulic cylinders). Moreover, no additional actively applied external forces need to be applied to cutting head assembly 12 in order to force cutting head assembly 12 back into the first orientation. For example, cutting head assembly 12 does not have to be forcibly rotated back into the first orientation by actively pushing or shoving cutting head assembly 12 in the appropriate rotational direction. In particular, cutting head assembly 12 will automatically or spontaneously return to the first orientation by itself under the influence of gravity when the rotational force is removed from cutting head assembly 12 due to the configuration of bearing assembly 34 and the weight distribution of cutting head assembly 12.

Having cutting head assembly 12 spontaneously return to the first orientation is an advantage of the present invention since it automatically locates cutting head assembly 12 in a position (i.e. the loading position; see FIG. 2A) that facilitates the loading or placement of another tree 86 into log channel 22.

INDUSTRIAL APPLICABILITY

During use of device 10, cutting head assembly 12 is initially located in the first orientation as shown in FIG. 2A. A tree 86 is then grasped by grapple 28 and placed into log channel 22 as shown in FIG. 1. Once tree 86 is positioned within log channel 22 such that a portion of tree 86 is resting on roller 96, cutting blades 16 and 18 are actuated such that they cooperate to surround tree 86. After actuating cutting blades 16 and 18, grapple 28 pulls tree 86 through log channel 22 in the direction indicated by arrow 102 such that cutting blades 16 and 18 cut branches 88 off of tree 86. Once an appropriate number of branches 88 of tree 86 are cut off, bar saw 20 is actuated such that bar saw 20 pivots in the direction indicated by arrow 112 (see FIG. 1) and tops tree 86 to produce a log (not shown). After toping tree 86, bar saw 20 is pivoted in the direction indicated by arrow 116 so that bar saw 20 is located within enclosure 110.

It should be understood that pulling tree 86 through log channel 22 in the above described manner imparts rotational forces to cutting head assembly 12 such that cutting assembly 12 is caused to rotate relative to frame 14 in the directions indicated by arrows 38 and 40. In particular, cutting head assembly 12 is rotated from the first orientation, as shown in FIG. 2A, to a second orientation, for example the orientation shown in FIG. 2B. However, once the delimbing process is finished for tree 86, tree 86 is removed from log channel 22 with grapple 28 such that the rotational forces are removed from cutting head assembly 12. Once the rotational forces are removed from cutting head assembly 12, cutting head assembly 12 spontaneously returns to the first orientation (see FIG. 2A) as described above. Having cutting head assembly 12 located in the first orientation facilitates the loading of the next tree 86 into log channel 22 such that the delimbing process can be repeated.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

What is claimed is:

1. A delimbing device arrangement, comprising:

a cutting head assembly;

a first support member supporting said cutting head assembly;

a second support member supporting said cutting head assembly;

a bearing assembly secured to said first support member and said second support member so that (i) said bearing assembly is interposed between said first support member and said second support member and (ii) said cutting head assembly can rotate relative to said second support member around an axis of rotation such that when a rotational force is applied to said cutting head assembly said cutting head assembly rotates from a first orientation to a second orientation, wherein said bearing assembly is configured so that when said rotational force is removed from said cutting head assembly said cutting head assembly spontaneously returns to said first orientation from said second orientation.

2. The arrangement of claim 1, wherein:

said first support member has a surface which defines a plane $P_1$, said second support member has a surface which defines a plane $P_2$, and said bearing assembly is further configured such that said first support member is tilted relative to said second support member so that said plane $P_1$ and said plane $P_2$ intersect to define an angle $\alpha$.

3. The arrangement of claim 2, wherein:

$1° \leq \alpha \leq 10°$.

4. The arrangement of claim 2, wherein:

$\alpha = 4.5°$.

5. The arrangement of claim 1, wherein:

said bearing assembly includes a riser ring interposed between said first support member and said second support member so that said riser ring supports said first support member, said riser ring has a first wall segment having a first height $H_1$, said riser ring has a second wall segment having a second height $H_2$, and said first height $H_1$ is greater than said second height $H_2$ such that a plane $P_1$ defined by a surface of said first support member intersects a plane $P_2$ defined by a surface of said second support member SO that an angle $\alpha$ is defined by said plane $P_1$ and said plane $P_2$.

6. The arrangement of claim 5, wherein:

said bearing assembly further includes (i) an outer hoop which defines an inner void, said outer hoop being secured to said first support member, (ii) an inner hoop secured to said riser ring, said inner hoop having a portion thereof positioned within said interior void of said outer hoop, and (iii) a number of ball bearings interposed between said portion of said inner hoop positioned within said inner void and said outer hoop.

7. The arrangement of claim 1, wherein:

said cutting head assembly includes a housing and a hydraulic component, said housing has a chamber defined therein, and said hydraulic component is located within said chamber.

8. The arrangement of claim 2, wherein:

said cutting head assembly includes a housing which defines a log channel having a blade end and an exit end, said blade end of said log channel is spaced vertically above said plane $P_2$ by a distance $D_1$ when said cutting head assembly is positioned in said first orientation, said exit end of said log channel is spaced vertically above said plane $P_2$ by a distance $D_2$ when said cutting head assembly is positioned in said first orientation, and said distance D1 is less than said distance D2.

9. The arrangement of claim 1, wherein:

said cutting head assembly includes a housing supported on said first support member, said housing includes a log channel defined by a first wall and a second wall, said first wall has a first end and a second end, said second wall having a third end and a fourth end, said first end of said first wall is secured to said first support member so that said first wall extends upwardly from said first support member, said third end of said second wall is secured to said first support member so that (i) said second wall extends upwardly from said first support member and (ii) said third end of said second wall is spaced apart from said first end of said first wall by a distance $D_3$, said first wall includes a first wall segment which is angled away from said second wall so that said second end of said first wall and said fourth end of said second wall are spaced apart from each other by a distance $D_4$, and said distance $D_4$ is greater than distance $D_3$.

10. A delimbing device, comprising:

a cutting head assembly having (i) a cutting blade configured to cut branches off of a tree and (ii) a bar saw configured to cut through said tree;

a first support member supporting said cutting head assembly;

a second support member supporting said cutting head assembly;

a bearing assembly secured to said first support member and said second support member so that (i) said bearing assembly is interposed between said first support member and said second support member and (ii) said cutting head assembly can rotate relative to said second support member around an axis of rotation such that when a rotational force is applied to said cutting head assembly said cutting head assembly rotates from a first orientation to a second orientation, wherein said bearing assembly is configured SO that when said rotational force is removed from said cutting head assembly said cutting head assembly spontaneously returns to said first orientation from said second orientation.

11. The device of claim 10, wherein:

said first support member has a surface which defines a plane $P_1$, said second support member has a surface which defines a plane $P_2$, and said bearing assembly is further configured such that said first support member is tilted relative to said second support member so that said plane $P_1$ and said plane $P_2$ intersect to define an angle $\alpha$.

12. The device of claim 11, wherein:

$1° \leq \alpha \leq 10°$.

13. The device of claim 11, wherein:

$\alpha = 4.5°$.

14. The device of claim 10, wherein:

said bearing assembly includes a riser ring interposed between said first support member and said second support member so that said riser ring supports said first support member, said riser ring has a first wall segment having a first height $H_1$, said riser ring has a second wall segment having a second height $H_2$, and said first height $H_1$ is greater than said second height $H_2$ such that a plane $P_1$ defined by a surface of said first support member intersects a plane $P_2$ defined by a surface of said second support member SO that an angle $\alpha$ is defined by said plane $P_1$ and said plane $P_2$.

15. The device of claim 14, wherein:

said bearing assembly further includes (i) an outer hoop which defines an inner void, said outer hoop being secured to said first support member, (ii) an inner hoop secured to said riser ring, said inner hoop having a portion thereof positioned within said interior void of said outer hoop, and (iii) a number of ball bearings interposed between said portion of said inner hoop positioned within said inner void and said outer hoop.

16. The device of claim 10, wherein:

said cutting head assembly includes a housing and a hydraulic component, said housing has a chamber define d therein, and said hydraulic component is located within said chamber.

17. The device of claim 11, wherein:

said cutting head assembly includes a housing which defines a log channel having a blade end and an exit end, said blade end of said log channel is spaced vertically above said plane $P_2$ by a distance $D_1$ when said cutting head assembly is positioned in said first orientation, said exit end of said log channel is spaced vertically above said plane $P_2$ by a distance $D_2$ when said cutting head assembly i s positioned in said first orientation, and said distance D1 is less than said distance D2.

18. A delimbing device comprising:

a cutting head assembly having a pair of cutting blades configured to cut branches from a tree;

a grapple configured to grasp said tree;

a frame for supporting said cutting head assembly and said grapple; and a bearing assembly interposed between said cutting head assembly and said frame so that said cutting head assembly can rotate relative to said frame around an axis of rotation such that when a rotational force is applied to said cutting head assembly said cutting head assembly rotates from a first orientation to a second orientation, wherein said bearing assembly is configured so that when said rotational force is removed from said cutting head assembly said cutting head assembly spontaneously returns to said first orientation from said second orientation.

19. The device of claim 18, wherein:

said bearing assembly includes a riser ring interposed between said frame and said cutting head assembly so that said riser ring supports said cutting head assembly, said riser ring has a first wall segment having a first height $H_1$, said riser ring has a second wall segment having a second height $H_2$, and said first height $H_1$ is greater than said second height $H_2$ such that said axis of rotation of said cutting head assembly intersects a longitudinal axis of said frame so as to define an angle $\beta$ which is less than 90°.

20. The device of claim 19, wherein:

said bearing assembly further includes (i) an outer hoop which defines an inner void, said outer hoop being secured to said cutting head assembly, (ii) an inner hoop secured to said frame, said inner hoop having a portion thereof positioned within said interior void of said outer hoop, and (iii) a number of ball bearings interposed between said portion of said inner hoop positioned within said inner void and said outer hoop.

\* \* \* \* \*